(12) United States Patent
Castaneda et al.

(10) Patent No.: US 12,041,565 B2
(45) Date of Patent: Jul. 16, 2024

(54) DEVICE FOR TRANSMITTING SYNCHRONIZATION INFORMATION USING A SPATIAL FILTER

(71) Applicant: Huawei Technologies Co., Ltd., Shenzhen (CN)

(72) Inventors: Mario Castaneda, Munich (DE); Richard Stirling-Gallacher, Munich (DE); Zhongfeng Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 17/436,955

(22) PCT Filed: Apr. 26, 2019

(86) PCT No.: PCT/EP2019/060794
§ 371 (c)(1),
(2) Date: Sep. 7, 2021

(87) PCT Pub. No.: WO2020/126115
PCT Pub. Date: Jun. 25, 2020

(65) Prior Publication Data
US 2022/0095257 A1 Mar. 24, 2022

(30) Foreign Application Priority Data

Dec. 20, 2018 (WO) .................. PCT/EP2018/086148

(51) Int. Cl.
*H04W 56/00* (2009.01)
*H04W 16/26* (2009.01)
(52) U.S. Cl.
CPC ....... *H04W 56/0015* (2013.01); *H04W 16/26* (2013.01)

(58) Field of Classification Search
CPC .... H04B 7/0695; H04B 7/0617; H04B 7/088; H04B 17/318; H04B 7/0408; H04B 7/043; H04W 16/26; H04W 16/28; H04W 56/0015; H04W 56/002; H04W 72/0446; H04W 72/046; H04W 72/535; H04W 76/27; H04W 80/02; H04W 80/06; H04W 80/08; G06F 16/245; G06F 16/29
USPC ...................................... 455/422.1
See application file for complete search history.

(56) References Cited

U.S. PATENT DOCUMENTS

| | | | |
|---|---|---|---|
| 11,349,543 B2 * | 5/2022 | Zhou | H04B 7/0617 |
| 2002/0067759 A1 | 6/2002 | Ertel et al. | |
| 2006/0233221 A1 | 10/2006 | Xu et al. | |
| 2016/0112101 A1 | 4/2016 | Kim et al. | |
| 2017/0289934 A1 * | 10/2017 | Sheng | H04W 56/001 |
| 2019/0174436 A1 * | 6/2019 | da Silva | H04W 16/28 |

(Continued)

OTHER PUBLICATIONS

NEC (Synchronization mechanism for NR V2X; R1-1810808; 3GPP TSB RAN WG1 meeting #94bis; Oct. 2018 (Year: 2018).*

(Continued)

*Primary Examiner* — Hirdepal Singh
(74) *Attorney, Agent, or Firm* — Slater Matsil, LLP

(57) ABSTRACT

A device for transmitting synchronization information, where the device is configured to determine whether the device should operate as a synchronization reference, and, in response to determining that the device shall operate as a synchronization reference, transmit synchronization information using a spatial filter.

19 Claims, 13 Drawing Sheets

Serving TRP
(in coverage Synchronization Reference)

UE A (Sync. Ref.)
UE B (Sync. Ref.)
UE C (Out of Coverage Sync. Ref.)
Interference Interference may result among SyncRefUEs when not considering other candidate synchronization references, when determining whether to transmit SLSS or not.

(56) References Cited

U.S. PATENT DOCUMENTS

2021/0377884 A1* 12/2021 Lee ..................... H04W 92/18
2021/0377893 A1* 12/2021 Khoryaev ............ H04L 5/0053

OTHER PUBLICATIONS

"3rd Generation Partnership Project; Technical Specification Group Radio Access Network; Study on New Radio (NR) access technology (Release 15)," 3GPP TR 38.912 V15.0.0, Jun. 2018, 74 pages.
"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.3.0, Sep. 2018, 918 pages.
Lopez, S.M., "An overview of D2D in 3GPP LTE standard," available at http://d2d-4-5g.gforge.inria.fr/Workshop-June2016/slides/Overview_LTE_D2D.pdf, Jun. 21, 2016, 34 pages.
"Initial View on NR V2X Sidelink Synchronization," Agenda item: 7.2.4.1.3, Source: Nokia, Nokia Shanghai Bell, Document for: Discussion and Decision, 3GPP TSG-RAN WG1 Meeting #94, R1-1809046, Gothenburg, Sweden, Aug. 20-24, 2018, 3 pages.
"On V2X Synchronization in NR," Agenda Item: 7.2.4.1.3, Source: InterDigital Inc., Document for: Discussion and Decision, 3GPP TSG RAN WG1 Meeting #94, R1-1809095, 4 pages.
"Summary of Offline Discussion on Sidelink Synchronization in NR V2X," Source: CATT, Agenda Item: 7.2.4.1.3, Document for: Discussion and Decision, 3GPP TSG RAN WG1 Meeting #94, R1-1809818, Gothenburg, Sweden, Aug. 19-24, 2018, 2 pages.
"Synchronization Mechanism for NR V2X," Agenda Item: 7.2.4.1.3, Source: NEC, Document for: Discussion/Decision, 3GPP TSG RAN WG1 Meeting #94bis, R1-1810808, Chengdu, China, Oct. 8-12, 2018, 4 pages.

* cited by examiner

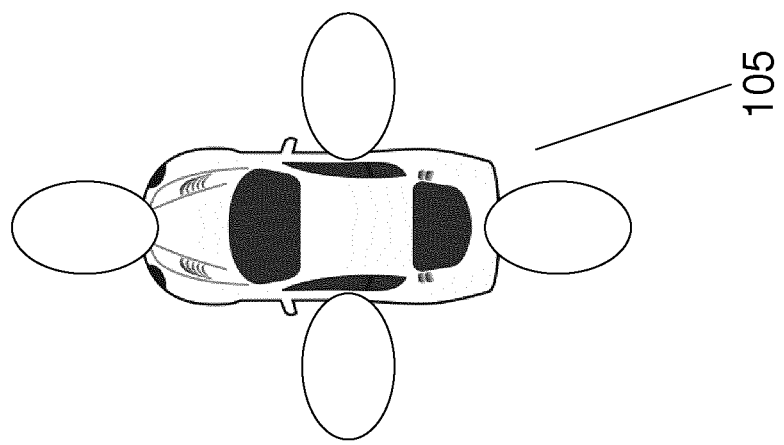
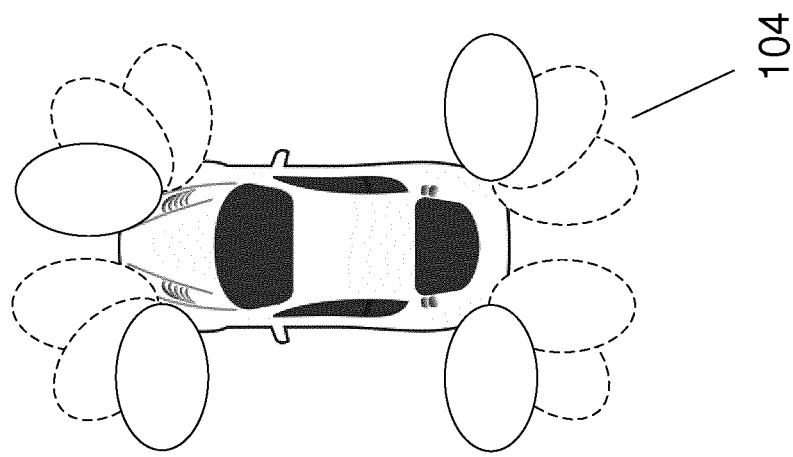
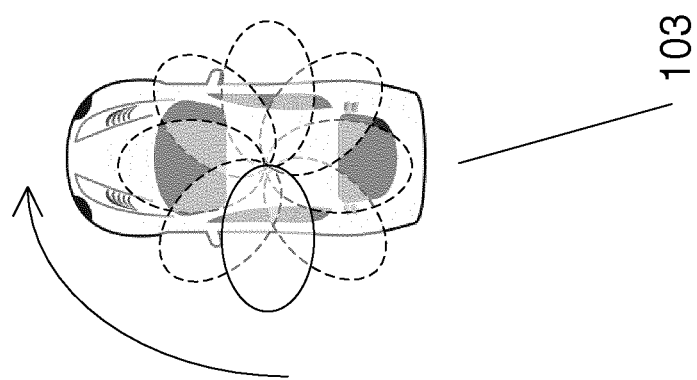
Fig. 1B

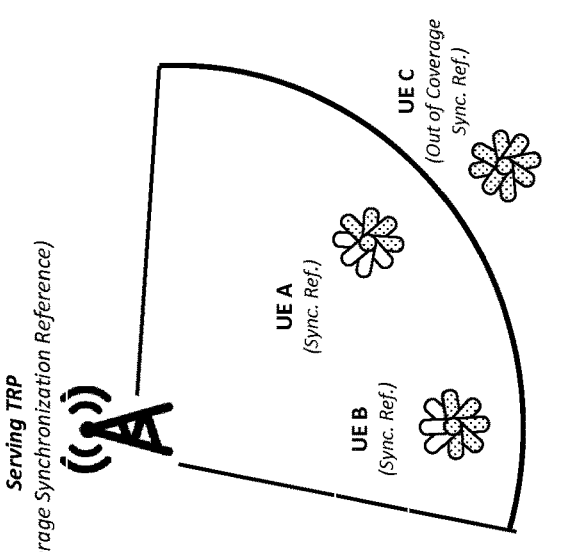

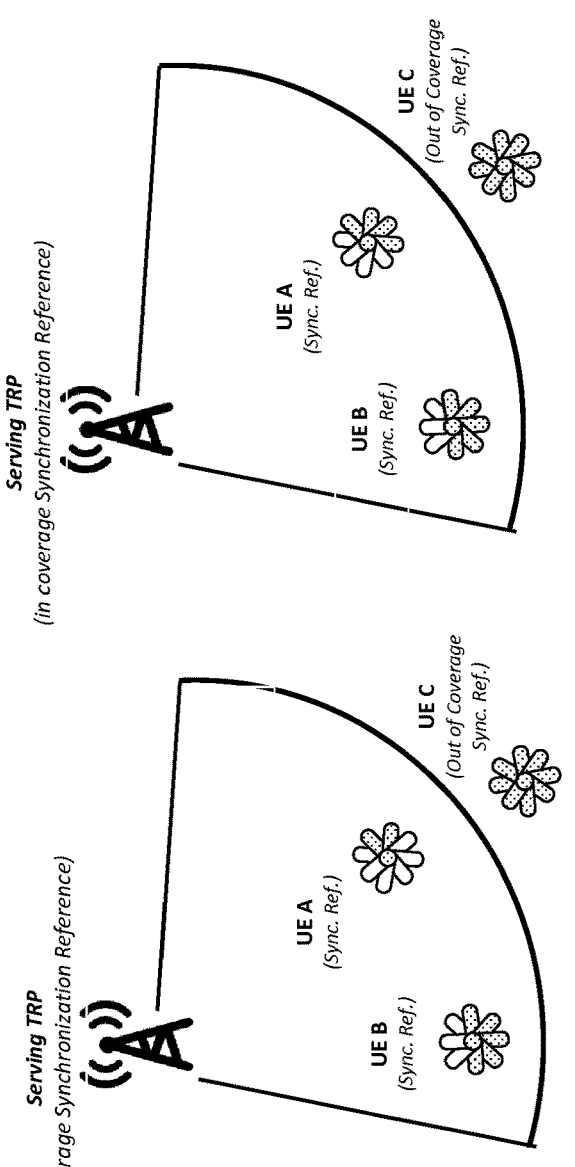

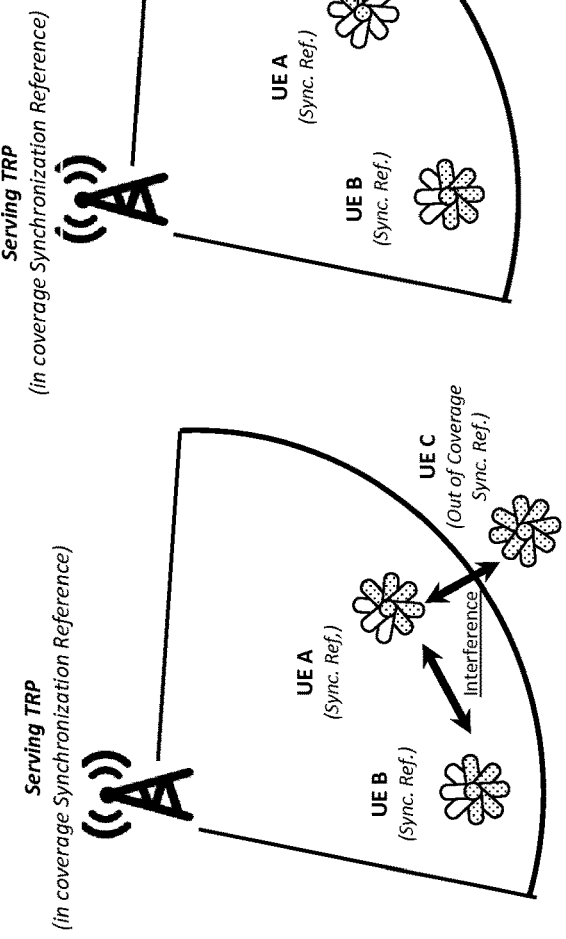

Interference may result among SyncRefUEs when not considering other candidate synchronization references, when determining whether to transmit SLSS or not.

Interference can be avoided if other candidate synchronization reference are considered when determining whether to transmit SLSS or not.

Only certain candidate synchronization references can be considered for the transmission of SLSS. In this example, UE A is configured to consider only in coverage UEs, such that UE A does not consider out of coverage UEs, i.e. UE C, when determining whether to transmit SLSS or not.

Fig. 6

DEVICE FOR TRANSMITTING SYNCHRONIZATION INFORMATION USING A SPATIAL FILTER

CROSS REFERENCE TO RELATED APPLICATIONS

This application is a national stage of International Application No. PCT/EP2019/060794, filed on Apr. 26, 2019, which claims priority to International Patent Application No. PCT/EP2018/086148, filed on Dec. 20, 2018. Both of the aforementioned applications are hereby incorporated by reference in their entireties.

TECHNICAL FIELD

The present disclosure relates to the transmission of synchronization information, in particular the transmission of sidelink synchronization signals (SLSS), e.g. by means of a user equipment (UE).

BACKGROUND

In the prior art, by transmitting synchronization information, i.e. by transmitting SLSS, a conventional UE becomes a synchronization reference which can be beneficial for coverage extension. A UE acting as a synchronization reference is referred to as SyncRefUE. Besides SLSS, the synchronization information may concern also timing information and additional configuration parameters (i.e. the MasterInformationBlock-SL message). The synchronization information transmitted by a UE may be derived from information/signals received from the network (i.e. when the UE is in coverage), or received from another UE acting as a synchronization reference for the UE, i.e. a SyncRefUE (i.e. when the UE is out of coverage) or received from a global navigation satellite system (GNSS). In the remainder, when referring to the transmission of SLSS, it is referred to the transmission of synchronization information, which comprises SLSS as well as possible additional information such as timing information and additional configuration parameters, as well as information for discovery announcements. Further, the following definitions are going to be used in this document: A transmit device is a device for sending a transmission, and a receive device is a device for receiving the transmission. A transmit device and a receive device may be implemented in a single device; such a device may be referred to as a transmit-receive point (TRP). Examples of TRPs include access nodes, evolved NodeBs (eNBs), next generation NodeBs (gNBs), base stations (BSs), NodeBs, master eNBs (MeNBs), secondary eNBs (SeNBs), remote radio heads, access points, user equipments (UEs), master UEs, mobiles, mobile stations, terminals, and the like.

In the prior art, for coverage extension, a UE shall transmit SLSS and become a synchronization reference. However, in order to reduce interference, the number of synchronization references shall be minimized or controlled, which is carried out in LTE Release 14 (3GPP Technical Specification TS 36.331 Release 14, version 14.2.2.) as discussed in the following.

The transmissions of SLSS can be done for different sidelink transmissions, e.g. transmission of sidelink discovery announcements, transmission of sidelink communication or transmission of V2X sidelink communication. According to LTE Release 14, Sections 5.10.7.1 and 5.10.7.2, a UE shall transmit SLSS, in general, as follows:

The UE is configured by the network (i.e. E-UTRAN) via a dedicated signal (network-based case) to transmit SLSS. (Note: for the network-based case, the UE is in coverage, e.g. in coverage on the frequency used for the sidelink transmission or in coverage of a serving cell); or The UE is not configured by dedicated signaling (UE-based case) and the UE determines whether it shall transmit SLSS based on a threshold, depending whether the UE is in coverage or out of coverage:

If the UE is in coverage and the threshold has been transmitted by the network and acquired/received by the UE, the UE shall transmit SLSS if the Reference Signal Received Power (RSRP) measurement of the reference cell or of the cell chosen for the sidelink transmission is below the threshold. (Note: The reference cell refers to the cell to be used as reference for synchronization and/or downlink (DL) measurements, which can correspond to a serving cell, primary cell, secondary cell or to the DL frequency paired with the one used for the sidelink transmission. Whether the RSRP measurement is taken from the reference cell or the cell chosen for the sidelink transmission may depend on the type of sidelink transmission or may be configured by the network); or If the UE is out of coverage and the threshold is included in the preconfigured sidelink parameters (and the UE is not directly synchronized to GNSS), the UE shall transmit SLSS if the UE has not selected a SyncRefUE (i.e. another UE acting as synchronization reference) or if the Sidelink-Reference Signal Received Power (S-RSRP) of the selected SyncRef UE is below the threshold. In case the UE selects GNSS as the synchronization reference source in out of coverage (e.g. for V2X sidelink communication), the UE shall transmit SLSS.

It is to be noted that, when the UE is in coverage, it could be out of coverage on the frequency used for the sidelink transmission (e.g. for V2X sidelink communication). In addition, the frequency used by the reference cell may or may not be the same as the frequency used for a sidelink transmission.

A flow chart for an example of when a UE shall transmit SLSS in LTE Rel. 14 (when transmitting sidelink discovery announcements) is illustrated in FIG. 11. When the UE is in coverage on the frequency used for sidelink discovery, it can transmit SLSS with the network-based case or with the UE-based case. When the UE is out of coverage, it can transmit SLSS with the UE-based case. If a UE is in coverage, the UE can be configured by the network (network-based case) to transmit SLSS by configuring the parameter networkControlledSyncTx and setting it to on. If the UE is in coverage and the networkControlledSyncTx is not configured, this corresponds to the in coverage UE-based case. For this case, the UE shall transmit SLSS (in coverage UE-based case), if the RSRP measurement of the reference cell is below the value of syncTxThreshIC, where the threshold is transmitted by the network as part of the system information. If the UE is out of coverage, the UE shall transmit SLSS (out of coverage UE-based case), if the UE has not selected a SyncRefUE or if the S-RSRP of the SyncRefUE, which serves as synchronization reference of the UE, is below the value of syncTxThreshOoC, where the threshold is preconfigured, i.e. it is included in the preconfigured sidelink parameters. Thus, for the UE-based case, a UE shall transmit SLSS if the RSRP or S-RSRP measurement of its synchronization reference is below a threshold, where the threshold depends on whether the UE is in coverage or out of coverage. This means, for example, that for the UE-based case, a UE which is close to a synchronization reference shall not transmit SLSS as e.g. shown in FIG. 12, where the synchronization reference could be a serving TRP in the serving cell when in coverage or a SyncRefUE when out of coverage.

Disadvantages of the approaches in LTE Rel. 14 are that transmitting SLSS in all directions may be inefficient and result in interference. This can e.g. be seen in the overlapping areas of coverage of the serving TRP and UE B in FIG. 12.

SUMMARY

In view of the above-mentioned problems and disadvantages, the present disclosure aims to improve the conventional transmission of synchronization information.

The present disclosure has the objective to allow for the transmission of SLSS in certain directions, i.e. by means of at least one spatial filter. In other words, the present disclosure considers beam-based transmission of SLSS.

An aspect of the present disclosure is a selective, beam-based transmission of SLSS from a device (e.g. a UE), i.e. the transmission of SLSS with selected spatial filters, where the selection of the spatial filters is determined by the network or by prior measurements (of signals from a transmit device) made at the device.

The present disclosure also provides a network-side device (e.g. a serving TRP), which can signal to the device (e.g. the UE) threshold values, configuration of synchronization references or types of synchronization references to consider, a configuration of the spatial filters to be used to transmit SLSS, a configuration of which information to transmit with the selective beam-based approach, and/or a configuration of resources based on which to make measurements.

A first aspect of the present disclosure provides a device for transmitting synchronization information, wherein the device is configured to determine if the device shall operate as a synchronization reference, and if yes, transmit synchronization information using a spatial filter.

The spatial filter in particular can be a transmission beam.

The spatial filter, in particular, can have a corresponding receive spatial filter (i.e. arranged in a predefined direction, each, in particular in a same direction or an opposite direction, each. Also, each receive spatial filter can be arranged in a predefined angle with regard to the corresponding spatial filter).

The receive spatial filter, in particular, can be a receiving beam.

A spatial filter at the device, e.g. UE, may be formed by any kind of beam-forming method (i.e. digital, RF or hybrid beam-forming). Different spatial filters at the device may correspond to different beam directions from a single beam-forming array, panel or antenna element on the device, or from one or more beam-forming arrays, panels or antenna elements on the device. Furthermore, in some implementations, each beam-forming array, panel or antenna element on the device could also form a single fixed spatial filter, i.e. a single fixed beam direction. A panel may be defined as a set of co-located antenna elements.

The synchronization information, in particular, can include a sidelink synchronization signal (SLSS).

In an implementation form of the first aspect, the device can further be configured to determine if the device shall operate as a synchronization reference based on configuration information received from a network-side device, and configure the spatial filter according to the received configuration information.

This is in particular an option if the device is in coverage of a signal, e.g. a signal used for sidelink transmission or a signal of a serving cell.

The configuration information can in particular be signalled in the received configuration information explicitly or implicitly.

In a further implementation form of the first aspect, the device can further be configured to determine if the device shall operate as a synchronization reference based on information obtained in the device, and configure the spatial filter according to the obtained information.

This is in particular an option if the device is in coverage of a signal, but also out of coverage of a signal, e.g. a signal used for sidelink transmission or a signal of a serving cell.

In a further implementation form of the first aspect, the device can further be configured to operate as a synchronization reference if a first value obtained based on a reference signal is lower than a first threshold value, in particular wherein the first threshold value is configured by a network-side device.

In particular, a first receive spatial filter is available at the device, and the device is further configured to measure the reference signal by means of the first receive spatial filter to obtain the first value.

Alternatively, the first threshold value can be pre-configured.

In a further implementation form of the first aspect, the device can further be configured to operate as a synchronization reference, if the device is out-of-coverage of a synchronization reference signal provided by a network side device.

This is in particular the case in a scenario in which the device is in coverage of a sidelink synchronization reference signal. In this case, the first threshold value is pre-configured in the device.

In a further implementation form of the first aspect, the device can further be configured to configure the spatial filter and/or the transmission of the synchronization information based on the first value and/or the first threshold value.

In a further implementation form of the first aspect, the device can further be configured to configure the spatial filter based on a correlation of a first receive spatial filter and the spatial filter.

The correlation, in particular, can indicate a receiving direction being the same as a transmitting direction, whereas a receiving direction may have a predefined angle towards a transmitting direction.

The receiving direction, in particular, can correspond to a direction of a signal received by the first receive spatial filter.

The transmitting direction, in particular, can correspond to a signal transmitted by the at least one spatial filter.

In a further implementation form of the first aspect, the device can further be configured to operate as a synchronization reference if a second value obtained based on the reference signal is lower than a second threshold value, and if the first value is lower than the first threshold value, in particular wherein the second threshold value is configured by a network-side device.

In particular, a second receive spatial filter is available at the device, and the device is further configured to measure the reference signal by means of the second receive spatial filter to obtain the second value.

In particular, the second value can be the highest value obtained based on the reference signal.

In a further implementation form of the first aspect, a direction of receiving the reference signal for obtaining the first value can be different from a direction of receiving the reference signal for obtaining the second value.

In particular, the direction of receiving the reference signal for obtaining the first value relates to a receiving direction of the first receive spatial filter, and a direction of receiving the reference signal for obtaining the second value relates to a receiving direction of the second receive spatial filter.

In a further implementation form of the first aspect, the device can further be configured to configure the spatial filter and/or the transmission of the synchronization information based on the second value and/or the second threshold value.

In particular, the second value can be higher than the first value, in particular, the second value can be the highest value obtained by a receive spatial filter available at the device, when measuring the reference signal by each receive spatial filter that is available at the device. In particular, the first threshold value can be lower than the second threshold value.

In a further implementation form of the first aspect, the device further can be configured to operate as a synchronization reference and to transmit the synchronization information, if a third value obtained based on the reference signal is lower than a third threshold value, in particular, wherein the third threshold value is configured by a network-side device.

In a further implementation form of the first aspect, the device further can be configured to configure the spatial filter and/or the transmission of the synchronization information based on a farther synchronization reference.

This is in particular an option if the device is in coverage of a signal, but also out of coverage of a signal, e.g. a signal used for sidelink transmission or a signal of a serving cell.

In a further implementation form of the first aspect, the device further can be configured to configure the spatial filter and/or the transmission of the synchronization information based on interference measurements obtained by measuring synchronization information transmitted by at least one further device.

A second aspect of the present disclosure provides a method for transmitting synchronization information, wherein the method comprises the steps of determining, by a device, if the device shall operate as a synchronization reference, and if yes, transmitting, by the device, a synchronization information using a spatial filter.

The spatial filter, in particular, can be a transmission beam.

The spatial filter, in particular, can have a corresponding receive spatial filter (i.e. arranged in a predefined direction, each, in particular in a same direction or an opposite direction, each. Also, each receive spatial filter can be arranged in a predefined angle with regard to the corresponding spatial filter).

The receive spatial filter, in particular, can be a receiving beam.

The synchronization information, in particular, can include a sidelink synchronization signal (SLSS).

In an implementation form of the second aspect, the method further can include the steps of determining if the device shall operate as a synchronization reference based on configuration information received from a network side device, and of configuring the spatial filter according to the received configuration information.

This is in particular an option if the device is in coverage of a signal, e.g. a signal used for sidelink transmission or a signal of a serving cell.

The configuration information can, in particular, be signalled in the received configuration information explicitly or implicitly.

In a further implementation form of the second aspect, the method further can include the steps of determining if the device shall operate as a synchronization reference based on information obtained in the device, and configuring the spatial filter according to the obtained information.

This is in particular an option if the device is in coverage of a signal, but also out of coverage of a signal, e.g. a signal used for sidelink transmission or a signal of a serving cell.

In a further implementation form of the second aspect, the method further can include the step of operating as a synchronization reference if a first value obtained based on a reference signal is lower than a first threshold value, in particular wherein the first threshold value is configured by a network side device.

In particular, a first receive spatial filter is available at the device, and the method includes measuring the reference signal by means of the first receive spatial filter to obtain the first value.

Alternatively, the first threshold value can be pre-configured.

In a further implementation form of the second aspect, the method further can include the step of operating as a synchronization reference, if the device is out-of-coverage of a synchronization reference signal provided by a network side device.

This is in particular the case in a scenario in which the device is in coverage of a sidelink synchronization reference signal. In this case, the first threshold value is pre-configured in the device.

In a further implementation form of the second aspect, the method further can include the step of configuring the spatial filter and/or the transmission of the synchronization information based on the first value and/or the first threshold value.

In a further implementation form of the second aspect, the method further can include the step of configuring the spatial filter based on a correlation of a first receive spatial filter and the spatial filter.

The correlation, in particular, can indicate a receiving direction being the same as a transmitting direction, whereas a receiving direction may have a predefined angle towards a transmitting direction.

The receiving direction, in particular, can correspond to a direction of a signal received by the first receive spatial filter.

The transmitting direction, in particular, can correspond to a signal transmitted by the at least one spatial filter.

In a further implementation form of the second aspect, the method further can include the step of operating as a synchronization reference if a second value obtained based on the reference signal is lower than a second threshold value, and if the first value is lower than the first threshold value, in particular wherein the second threshold value is configured by a network side device.

In particular, a second receive spatial filter is available at the device, and the method further can include the step of measuring the reference signal by means of the second receive spatial filter to obtain the second value.

In particular, the second value can be the highest value obtained based on the reference signal.

In a further implementation form of the second aspect, a direction of receiving the reference signal for obtaining the first value can be different from a direction of receiving the reference signal for obtaining the second value.

In particular, the direction of receiving the reference signal for obtaining the first value relates to a receiving direction of the first receive spatial filter, and a direction of receiving the reference signal for obtaining the second value relates to a receiving direction of the second receive spatial filter.

In a further implementation form of the second aspect, the method further can include the step of configuring the spatial filter and/or the transmission of the synchronization information based on the second value and/or the second threshold value.

In particular, the second value can be higher than the first value, in particular the second value can be the highest value obtained by a receive spatial filter available at the device, when measuring the reference signal by each receive spatial filter that is available at the device. In particular, the first threshold value can be lower than the second threshold value.

In a further implementation form of the second aspect, the method further can include the step of operating as a synchronization reference and to transmit the synchronization information, if a third value obtained based on the reference signal is lower than a third threshold value, in particular, wherein the third threshold value is configured by a network side device.

In a further implementation form of the second aspect, the method further can include the step of configuring the spatial filter and/or the transmission of the synchronization information based on a farther synchronization reference.

This is in particular an option if the device is in coverage of a signal, but also out of coverage of a signal, e.g. a signal used for sidelink transmission or a signal of a serving cell.

In a further implementation form of the second aspect, the method further can include the step of configuring the spatial filter and/or the transmission of the synchronization information based on interference measurements obtained by measuring synchronization information transmitted by at least one further device.

The second aspect and its implementation forms include the same advantages as the first aspect and its implementation forms.

A third aspect of the present disclosure provides a network-side device, configured to determine configuration information for transmitting synchronization information by a device, wherein the configuration information supports the device in determining if the device is a synchronization reference, and in configuring a spatial filter, and transmit the configuration information to the device.

The configuration information, in particular, can include a reference signal.

In an implementation form of the third aspect, the device further can be configured to configure a first threshold value, and/or a second threshold value, and/or a third threshold value in the device, for determining by the device if the device is a synchronization reference.

A fourth aspect of the present disclosure provides a method for operating a network-side device, the method comprising the step of determining configuration information for transmitting synchronization information by a device, wherein the configuration information supports the device in determining if the device is a synchronization reference, and in configuring a spatial filter, and wherein the method further comprises the step of transmitting the configuration information to the device.

The configuration information, in particular, can include a reference signal.

In an implementation form of the fourth aspect, the method further can include the step of configuring a first threshold value, and/or a second threshold value, and/or a third threshold value in the device, for determining by the device if the device is a synchronization reference.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above-described aspects and implementation forms of the present disclosure will be explained in the following description of specific embodiments in relation to the enclosed drawings, in which:

FIG. 1B shows a schematic view of a device according to another embodiment of the present invention.

FIG. 6 shows another operating manner of a device according to an embodiment of the present invention.

DETAILED DESCRIPTION OF ILLUSTRATIVE EMBODIMENTS

Figure 1A:
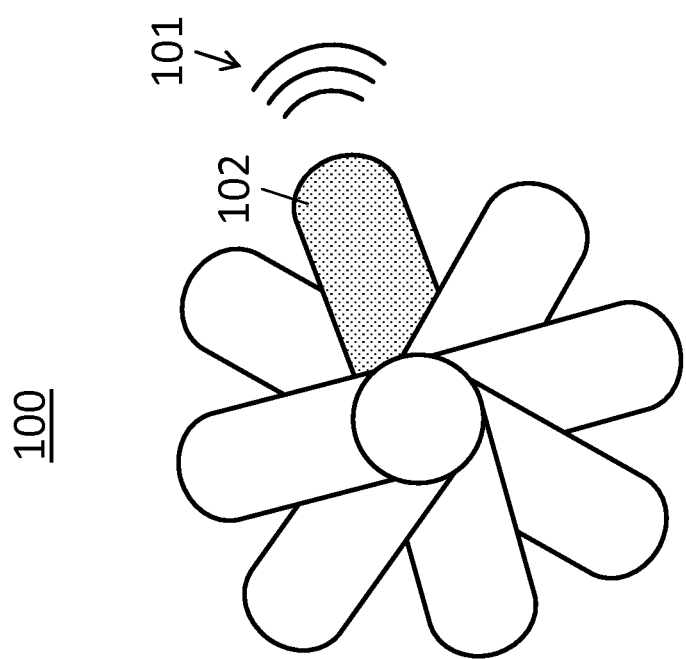
FIG. 1A shows a schematic view of a device according to an embodiment of the present invention.

FIG. 1A shows a schematic view of a device 100 according to an embodiment of the present invention. The device 100 is for transmitting synchronization information 101 and can e.g. be a UE. To transmit the synchronization information 101, the device 100 is configured to determine if the device 100 shall operate as a synchronization reference. If yes, the device is configured to transmit synchronization information 101 using a spatial filter 102. The spatial filter 102 can e.g. be a transmission beam. Although there are eight spatial filters 102 shown in FIG. 1A, there can be an arbitrary number of spatial filters 102 in the device 100

That is, the present disclosure allows for a selective beam-based transmission of SLSS at the UE, when a UE becomes a synchronization reference.

Optionally, the determination if the device 100 shall operate as a synchronization reference can either be done in a network side, or in the device 100 itself. That is, the present disclosure covers a network-based case, as well as a device 100 (or UE) based case.

It is to be noted that, in the device-based case, a beam correspondence is separated between cases when "a beam correspondence holds at a UE" and when "a beam correspondence does not hold at a UE". Beam correspondence at the UE holds if there is correspondence (reciprocity) between the Tx beams (i.e. the spatial filters) and Rx beams (e.g. receive spatial filters) of the UE, e.g. if the UE is able to determine a UE Tx beam for the uplink transmission based on the UE's downlink measurement on the UE's one or more Rx beams. The UE may indicate its capabilities and beam correspondence related information to the network.

In the network-based case, the device 100 (e.g. a UE) is configured by the network via dedicated signalling to transmit SLSS on a specific set of spatial filters (resources), e.g. Tx beams, where the specific set of spatial filters, e.g. Tx beams, can be determined by the network e.g. based on prior measurement reports and/or based on spatial filters used to receive a signal from the network, e.g. from the serving cell. (Note: beam correspondence may or may not hold at the UE).

In other words, the device 100 optionally can determine if the device 100 shall operate as a synchronization reference based on configuration information received from a network side device 1000, and configure the spatial filter 102 according to the received configuration information.

In the device-based case, when beam correspondence holds at the UE, the present disclosure provides two methods, which enable the UE to transmit SLSS on selected spatial filters, i.e. Tx beams, where the selected spatial filters are determined based on one or two thresholds, as discussed in the following, where the threshold(s) depend(s) on the synchronization reference and whether the UE is in coverage or out of coverage.

When beam correspondence does not hold at the UE, the present disclosure provides a third method to enable the UE to determine when to transmit SLSS according to a threshold, as discussed in the following, where the threshold(s) depend(s) on the synchronization reference and whether the UE is in coverage or out of coverage. In addition, the thresholds for the different methods may not be the same.

That is, in other words, the device 100 optionally can determine if the device 100 shall operate as a synchronization reference based on information obtained in the device 100, and configure the spatial filter 102 according to the obtained information.

In general, the synchronization reference of the UE may refer to a serving TRP or to another UE which is acting as a reference for synchronization by the UE when in coverage or out of coverage. The frequency used by the synchronization reference may or may not be the same as the frequency used for the sidelink transmission. In addition, in case the configured resources are insufficient to transmit SLSS according to the proposed methods, it is up to UE implementation to decide on which spatial filters, out of the selected set or configured set of spatial filters, to transmit SLSS.

FIG. 1B shows a schematic view of a user device according to another embodiment of the present invention. As can be seen from the figure, different spatial filters at the device may correspond to different beam directions. Different spatial filters may be formed from a single beam-forming array, a panel or antenna element on the device. Alternatively, spatial filters may be formed using one or more beam-forming arrays, panels or antenna elements on different locations of the device. Furthermore, in some implementations, each beam-forming array, panel or antenna element on the device, could also form a single fixed spatial filter, i.e. a single fixed beam direction. A panel may be defined as a set of co-located antenna elements.

FIG. 1B shows an example of three possible scenarios in which the UE is a vehicle. In 103, different beam directions are formed using a single beam-forming array, a panel or an antenna element located at a single position. In 104, different beam directions are formed using multiple beam-forming arrays, panels or antenna elements, which are at different locations on the vehicle. In 105, a scenario is illustrated, in which fixed beams are formed using multiple beam-forming arrays, panels or antenna elements at different locations of the vehicle.

Although FIG. 1B illustrates the different scenarios with reference to a car, it is clear that this is only one possible example of a UE and the spatial filters described above may also be embodied in different types of UEs, such as, for instance, a mobile phone or any vehicle.

Figure 2:
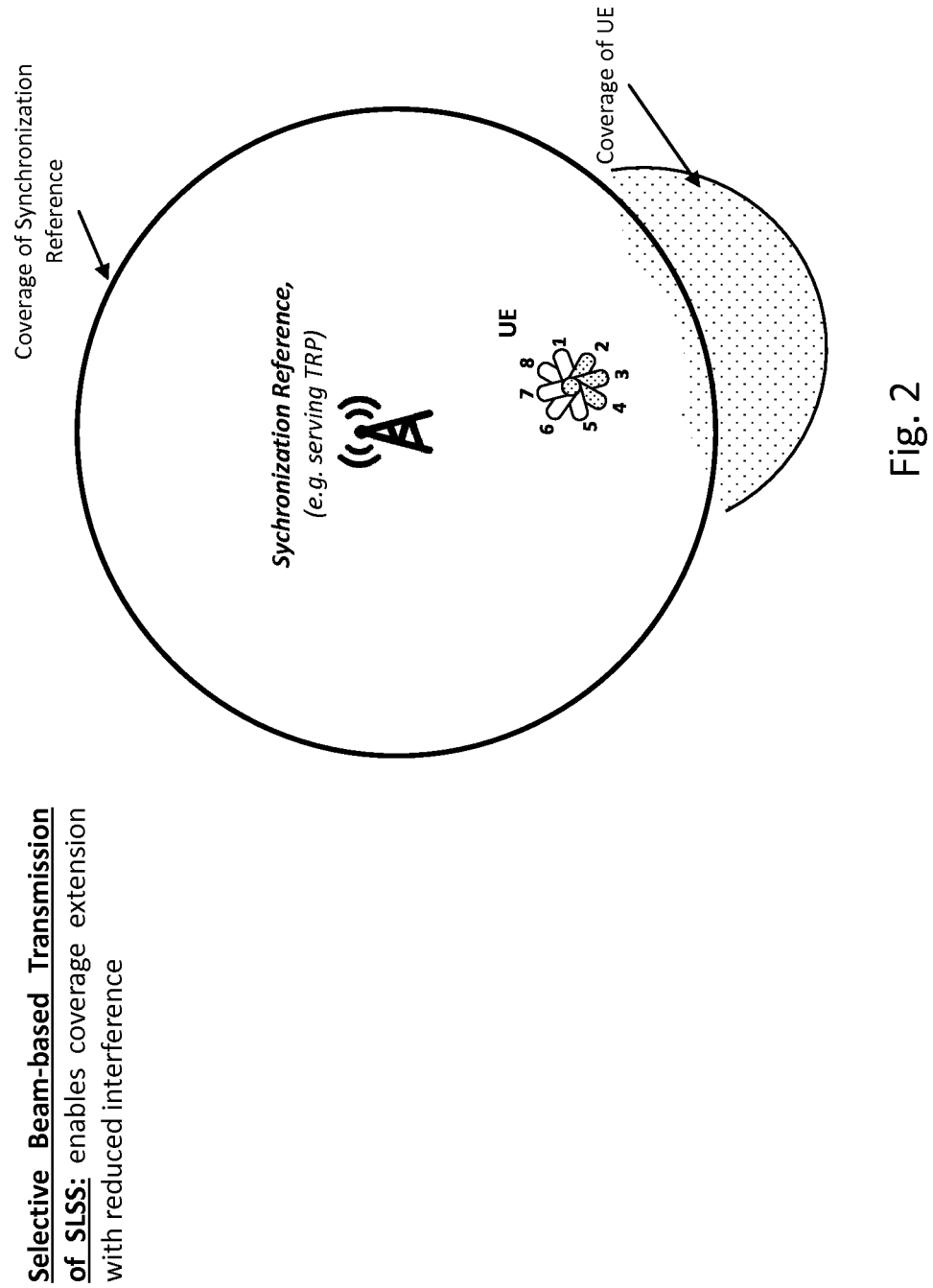
FIG. 2 shows an operating manner of a device according to an embodiment of the present invention.

As it is e.g. illustrated in FIG. 2, the present disclosure considers beam-based transmission of SLSS from a UE serving as synchronization reference. With the selective beam-based transmission of SLSS, (selective) coverage extension is provided with reduced interference, by transmitting SLSS away from the synchronization reference and by not transmitting SLSS in all directions. By transmitting SLSS on certain directions, i.e. on certain spatial filters (i.e. Tx beams), interference can be reduced while still enabling the coverage extension as depicted in FIG. 2.

For the network-based case, the (transmit) spatial filters with which the UE shall transmit SLSS are configured by the network, where the indication of the spatial filters may be done implicitly or explicitly. For the UE-based case, when and with which spatial filters shall a UE transmit SLSS is optionally determined based on the RSRP or S-RSRP of the synchronization reference and based on thresholds as discussed below for method 1, method 2 and method 3 in view of FIG. 3, FIG. 4 and FIG. 5.

Figure 3:
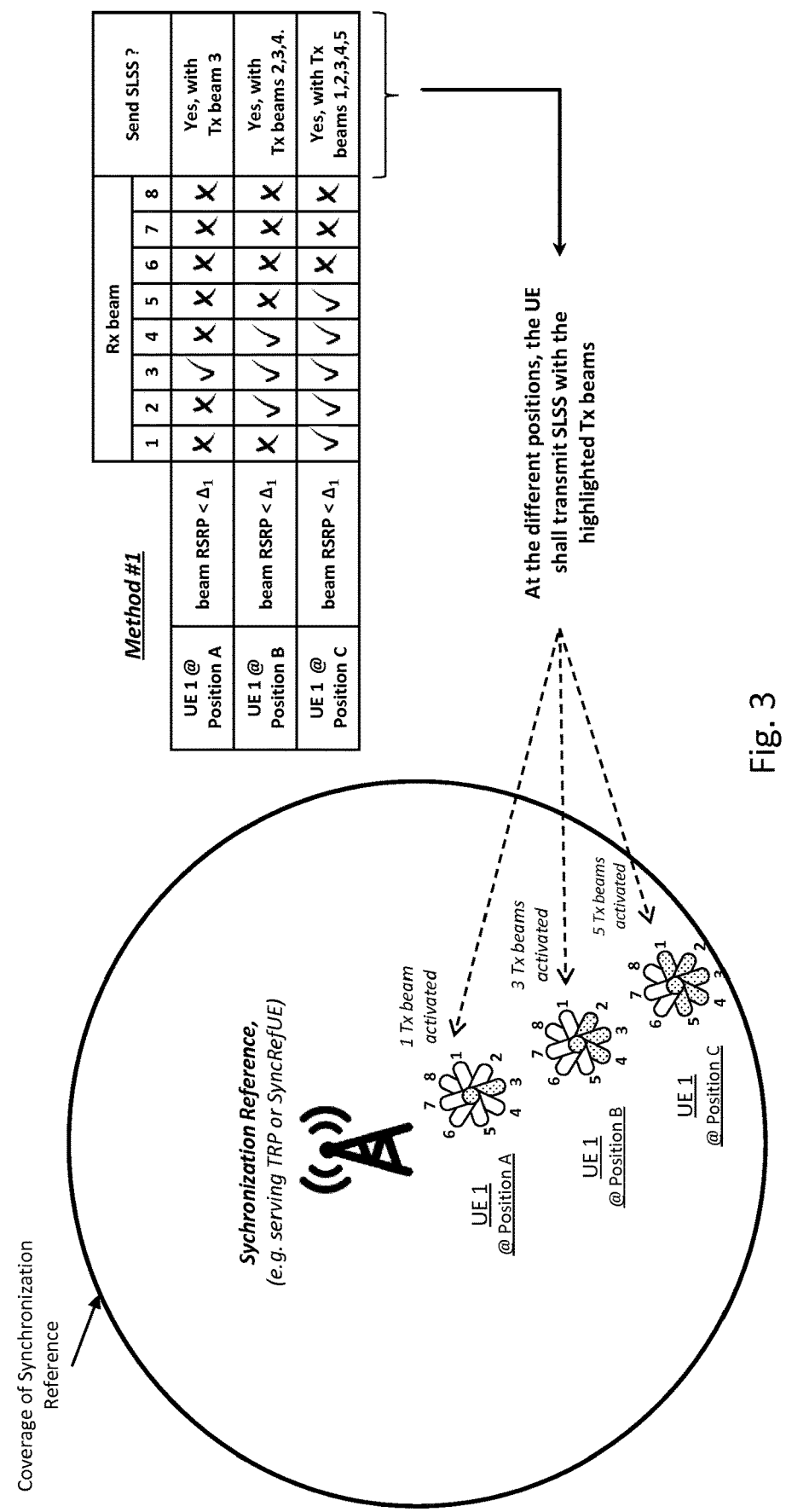
FIG. 3 shows another operating manner of a device according to an embodiment of the present invention.

In view of FIG. 3, method 1 is now going to be discussed. When UE beam correspondence holds, if the RSRP measurement (or S-RSRP measurement, e.g. if the synchronization reference is a SyncRefUE) of the synchronization reference measured with a (receive) spatial filter is below a first threshold, the UE shall transmit SLSS with the same (transmit) spatial filter, wherein the threshold can depend on the synchronization reference and on whether the UE is in coverage or out of coverage.

The spatial filter can refer to a beam, such that method 1 can be expressed as follows: If the RSRP (or S-RSRP) measurement of the synchronization reference measured with a Rx beam is below a first threshold, the UE shall transmit SLSS with the Tx beam, which is a beam correspondent to the Rx beam.

Method 1 results in the transmission of the SLSS in a spatial direction if the UE did not measure a signal above a first threshold on that spatial direction from the synchronization reference. For example, it is assumed that the first threshold is equal to $\Delta_1$ and it is considered UE 1 (located at different positions in FIG. 3) with beam correspondence and with 8 Tx beams and 8 Rx beams, e.g. Tx beam #j=Rx beam #j. As shown in FIG. 3, depending on the position where UE 1 is located, i.e. position A, B and C, UE 1 transmits SLSS with different Tx beams according to the RSRP (or S-RSRP) measurement with each Rx beams as shown in the table.

In other words, the device 100 can further be configured to operate as a synchronization reference if a first value obtained based on a reference signal is lower than a first threshold value, in particular wherein the first threshold value is configured by a network-side device 1000.

This is in particular possible, if the device 100 is out-of-coverage of a synchronization reference signal provided by a network side device 1000.

Again, in other words, the device 100 can further be configured to configure the spatial filter 102 and/or the transmission of the synchronization information 101 based on the first value and/or the first threshold value.

Again, in other words, the device 100 can further be configured to configure the spatial filter 102 based on a correlation of a first receive spatial filter and the spatial filter 102.

Method 1 can optionally be extended to consider two thresholds (i.e. to additionally consider a second threshold), as it is going to be discussed in method 2 below in view of FIG. 4.

Figure 4:
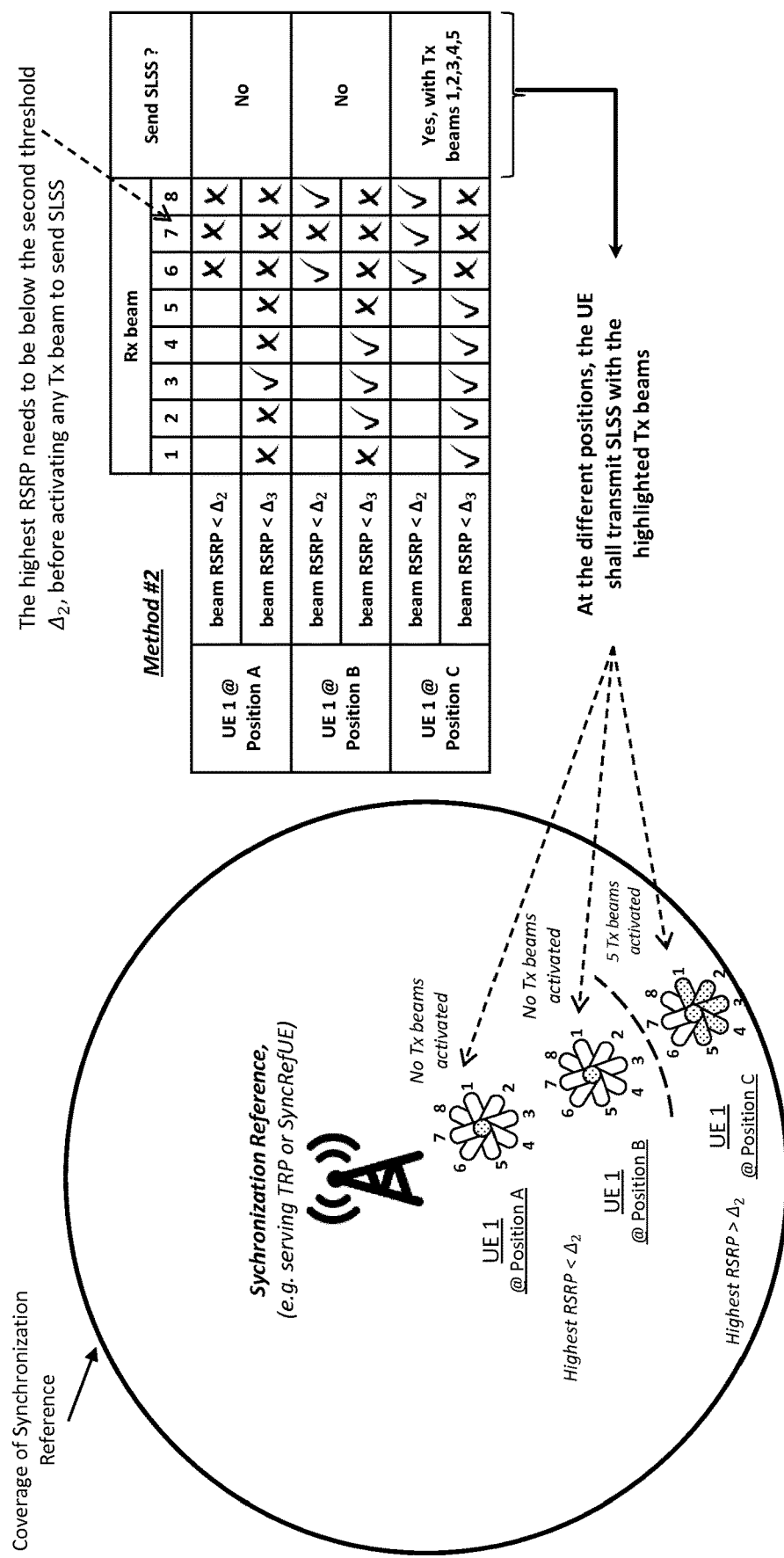
FIG. 4 shows another operating manner of a device according to an embodiment of the present invention.

FIG. 4 describes the operating principle of the device 100 in view of optional method 2. When UE beam correspondence holds, if the highest RSRP (or S-RSRP) measurement of the synchronization reference is below a second threshold, and if the RSRP (or S-RSRP) measurement of the synchronization reference measured with a (receive) spatial filter is below the first threshold, the UE shall transmit SLSS with the same (transmit) spatial filter, where the first threshold may be less than the second threshold and the thresholds can depend on the synchronization reference and on whether the UE is in coverage or out of coverage.

The highest RSRP of the synchronization reference, can be e.g. determined by the UE making measurements with all the available (receive) spatial filters, or with the set of (receive) spatial filters used to receive the connection (strongest signals) from the synchronization reference, e.g. with the Rx beams used to receive reference (e.g. CSI-RS), control or synchronization signals from a serving TRP acting as the UE's synchronization reference, or sidelink reference, sidelink control or sidelink synchronization signals from a SyncRefUE acting as the UE's synchronization reference.

The spatial filter can refer to a beam, such that method 2 can be expressed as follows: if the highest RSRP measurement of the synchronization reference (e.g. among all the Rx beams used to receive reference signals) is below a second threshold, method 2 allows a Tx beam specific transmission of SLSS, if the RSRP measurement of the synchronization reference measured on the Rx beam, which is beam correspondent to the Tx beam, is below the first threshold.

Therefore, method 2 can be viewed as method 1 which is triggered by a condition based on the second threshold. The advantage of method 2 over method 1 is that with method 2 the UE makes measurements with fewer beams when it is close to a synchronization source. Method 2 allows also for a more flexible transmission of SLSS, by not enabling a UE close to a synchronization reference to send SLSS.

For example, it is assumed that the second and first threshold are equal to $\Delta_2$ and $\Delta_3$, and it is considered UE 1 (located at different positions in FIG. 4) with beam correspondence and with 8 Tx beams and 8 Rx beams, e.g. Tx beam #j=Rx beam #j. Furthermore, it is assumed that Rx beams #6, 7, 8 are used for receiving reference signals from the synchronization reference at the different positions A, B and C, i.e. these Rx beams are used to receive the strongest signals from the synchronization reference. As shown in FIG. 4, depending on the position where UE 1 is located, i.e. position A, B and C, UE 1 transmits SLSS with different Tx beams according to the RSRP (or S-RSRP) measurement with the Rx beams as shown in the table.

That is, in other words, the device can further be configured to operate as a synchronization reference if a second value obtained based on the reference signal is lower than a second threshold value, and if the first value is lower than the first threshold value, in particular wherein the second threshold value is configured by a network side device 1000.

Further, a direction of receiving the reference signal for obtaining the first value can be different from a direction of receiving the reference signal for obtaining the second value.

Again, in other words, the device can further be configured to configure the spatial filter 102 and/or the transmission of the synchronization information 101 based on the second value and/or the second threshold value.

The UE-based methods when beam correspondence holds at the UE have now been discussed. In the following, a method when beam correspondence does not hold at the UE is going to be discussed in view of FIG. 5.

Figure 5:
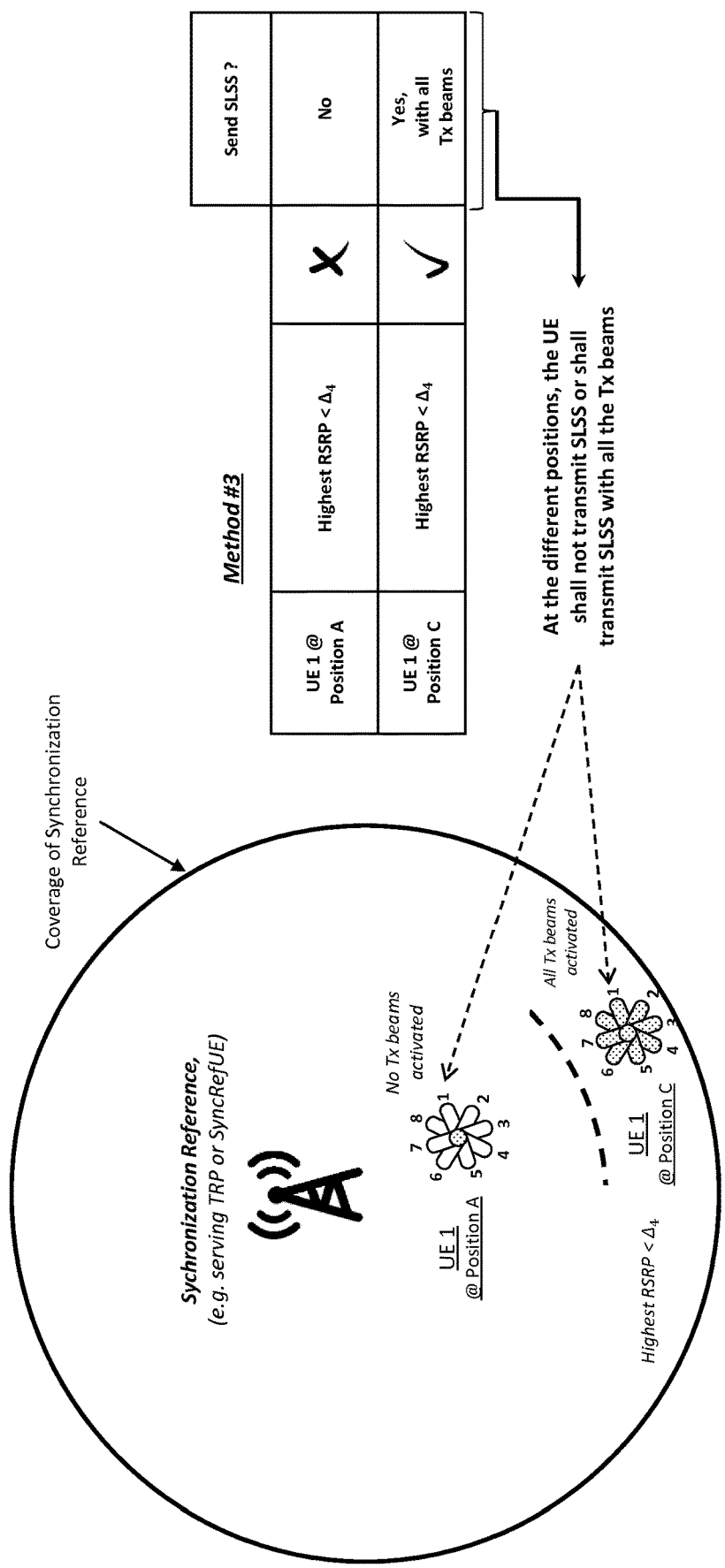
FIG. 5 shows another operating manner of a device according to an embodiment of the present invention.

In view of FIG. 5, method 3 is going to be discussed. When UE beam correspondence does not hold, if the highest RSRP (or S-RSRP) measurement of the synchronization reference is below a third threshold, the UE shall transmit SLSS with available (transmit) spatial filters, where the third threshold can depend on the type of synchronization reference and on whether the UE is in coverage or out of coverage. For example, it is assumed that the threshold is $\Delta_4$ and it is considered UE 1 (located at different positions) with no beam correspondence. As shown in FIG. 5, depending on the position where UE 1 is located, i.e. position A and C, UE 1 transmits SLSS with its Tx beams according to the RSRP (or S-RSRP) measurement with the Rx beams as shown in the table.

In other words, the device 100 further can be configured to operate as a synchronization reference and to transmit the synchronization information 101, if a third value obtained based on the reference signal is lower than a third threshold value, in particular wherein the third threshold value is configured by a network side device 1000.

As it is now going to be described in view of FIG. 6, the present disclosure also covers a case with multiple candidate synchronization references. The synchronization reference of the UE refers to the device (e.g. serving TRP or SyncRefUE) which is acting as the reference for synchronization for the UE. A candidate synchronization reference refers to other nearby devices (or the network) which are acting as synchronization references, e.g. other SyncRefUEs sending SLSS or other TRPs sending synchronization information. For example, assume multiple UEs (UE A and UE B in coverage of a serving TRP, and UE C out of coverage) are configured via the UE-based method 1 to act as synchronization references as shown in FIG. 6a. Having UE A, UE B and UE C act as SyncRefUEs, leads to interference, since these SyncRefUEs have only consider measurements from the serving TRP when determining on which beams to transmit SLSS. To this end, the UE-based methods are extended to consider measurements/signals from multiple candidate synchronization references when determining whether a UE shall transmit SLSS or not, i.e. whether it becomes a synchronization reference or not. For instance, a UE shall transmit SLSS in a spatial direction, if it didn't sense any synchronization reference (be it its synchronization reference or other candidate synchronization references) above a threshold on that spatial direction. For example, assuming UE B and UE C in FIG. 6b are already configured as synchronization references, and assuming UE A is configured via a UE-based method (e.g. method 1-A described below) to transmit SLSS taking into account the measurements from all nearby synchronization references, it can then be configured to transmit SLSS away from the already existing synchronization references as shown in FIG. 6b. This also enables a more efficient transmission of SLSS, as UE A would not transmit SLSS in areas where another SyncRefUE is already transmitting SLSS.

Note that for the proposed network-based method, multiple candidate synchronization references can be considered, based on prior measurements, but this may be transparent to the UE.

The above proposed methods for the UE-based case can be extended to consider multiple candidate synchronization references as follows:

Method 1-A: when UE beam correspondence holds, if the RSRP (or S-RSRP) measurement of the synchronization reference and/or the RSRP (S-RSRP) of (nearby) candidate synchronization references measured with a (receive) spatial filter are below a threshold, the UE shall transmit SLSS with the same (transmit) spatial filter, where the threshold can depend on the synchronization reference and on whether the UE is in coverage or out of coverage.

Method 1-A enables the transmission of SLSS away from the (nearby) synchronization references.

Method 2-A: when UE beam correspondence holds, if the highest RSRP (or S-RSRP) measurement of the synchronization reference is below a second threshold, and if the RSRP (or S-RSRP) measurement of the synchronization reference and/or the RSRP (S-RSRP) measurement of (nearby) candidate synchronization references measured with a (receive) spatial filter are below a first threshold, the UE shall transmit SLSS with the same (transmit) spatial filter, where the first threshold may be less than the second threshold, and where the thresholds, in particular the first one, can depend on the synchronization reference and on whether the UE is in coverage or out of coverage.

Method 2-B: when UE beam correspondence holds, if the highest RSRP (or S-RSRP) measurement of the synchronization reference and/or the RSRP (S-RSRP) measurement of (nearby) candidate synchronization references are below a second threshold, and if the RSRP (or S-RSRP) of the synchronization reference and/or the RSRP (S-RSRP) measurement of (nearby) candidate synchronization references measured with a (receive) spatial filter are below a first threshold, the UE shall transmit SLSS with the same (transmit) spatial filter, where the first threshold may be less than the second threshold, and where the thresholds, in particular the first one, can depend on the synchronization reference and on whether the UE is in coverage or out of coverage.

Method 2-A considers multiple candidate synchronization references for the first condition, whereas method 2-B considers multiple candidate synchronization references for both conditions. Both methods enable the transmission of SLSS from a UE away from the (nearby) synchronization references, but when the UE is not close to its synchronization source, for method 2-A, and when the UE is not close to any of the (nearby) synchronization sources, for method 2-B.

Method 3-A: when UE beam correspondence does not hold, if the highest RSRP (or S-RSRP) measurement of the synchronization reference and/or the RSRP (S-RSRP) measurement of (nearby) candidate synchronization references are below a threshold, the UE shall transmit SLSS with available (transmit) spatial filters, where the threshold can depend on the synchronization reference and on whether the UE is in coverage or out of coverage.

Method 3-A enables the transmission of SLSS when not being close to any of the (nearby) synchronization reference.

In other words, the device 100 may further be configured to configure the spatial filter 102 and/or the transmission of the synchronization information 101 based on a further synchronization reference.

Additional, optional features of the present disclosure are discussed in the following:

For the proposed UE-based methods, the UE may be configured to consider only certain candidate synchronization references for the transmission of SLSS. For example, an in coverage UE may be configured to consider the RSRP or S-RSRP measurements only from other serving TRPs or SyncRefUEs which are in coverage. If this were the case, for example, UE A could then transmit SLSS on the spatial directions on which it received a signal from UE C in FIG. 6c. This provides the advantage, that the synchronization references can be prioritized, i.e. in coverage SyncRefUEs may have higher priority than out of coverage SyncRefUEs.

The UE may be configured to use only a subset of its available spatial filters, i.e. Tx beams, for sending SLSS. For example, a UE which is in coverage can be configured (network-based or UE-based) to use only a selected subset of Tx beams for sending SLSS, where the selected subset of Tx beams may be determined or indicated by the network based on prior measurement reports. This provides the advantage that the UE shall not need to make measurements on all Rx beams.

Although the synchronization information concerns mainly SLSS, the proposed approach can also be used to send additional information on each spatial filter (beam), such as timing information, additional configuration parameters, i.e. MasterInformationBlock-SL, PBCH, information for discovery announcements, etc. This provides the advantage that the transmission of the additional information can also benefit from the advantage of the selective beam-based transmission of the SLSS.

For the UE-based case, the UE may be configured (in coverage) or pre-configured (out of coverage) to know when or how often (e.g. periodicity) to make such measurements for determining whether it shall become a synchronization reference or not, i.e. for the selective beam-based transmission of SLSS. This provides the advantage that the UE knows when to make measurements for determining whether it shall transmit SLSS or not, and may lead to saving battery power.

As noted before, in case the configured resources (e.g. frequency resources, time resources, transmit power, etc.) are insufficient to transmit SLSS according to the proposed methods, it is up to UE implementation to decide on which spatial filters to transmit SLSS.

Based on the proposed network-based method and the UE-based methods described previously, more specific embodiments are discussed in the following.

Figure 7:
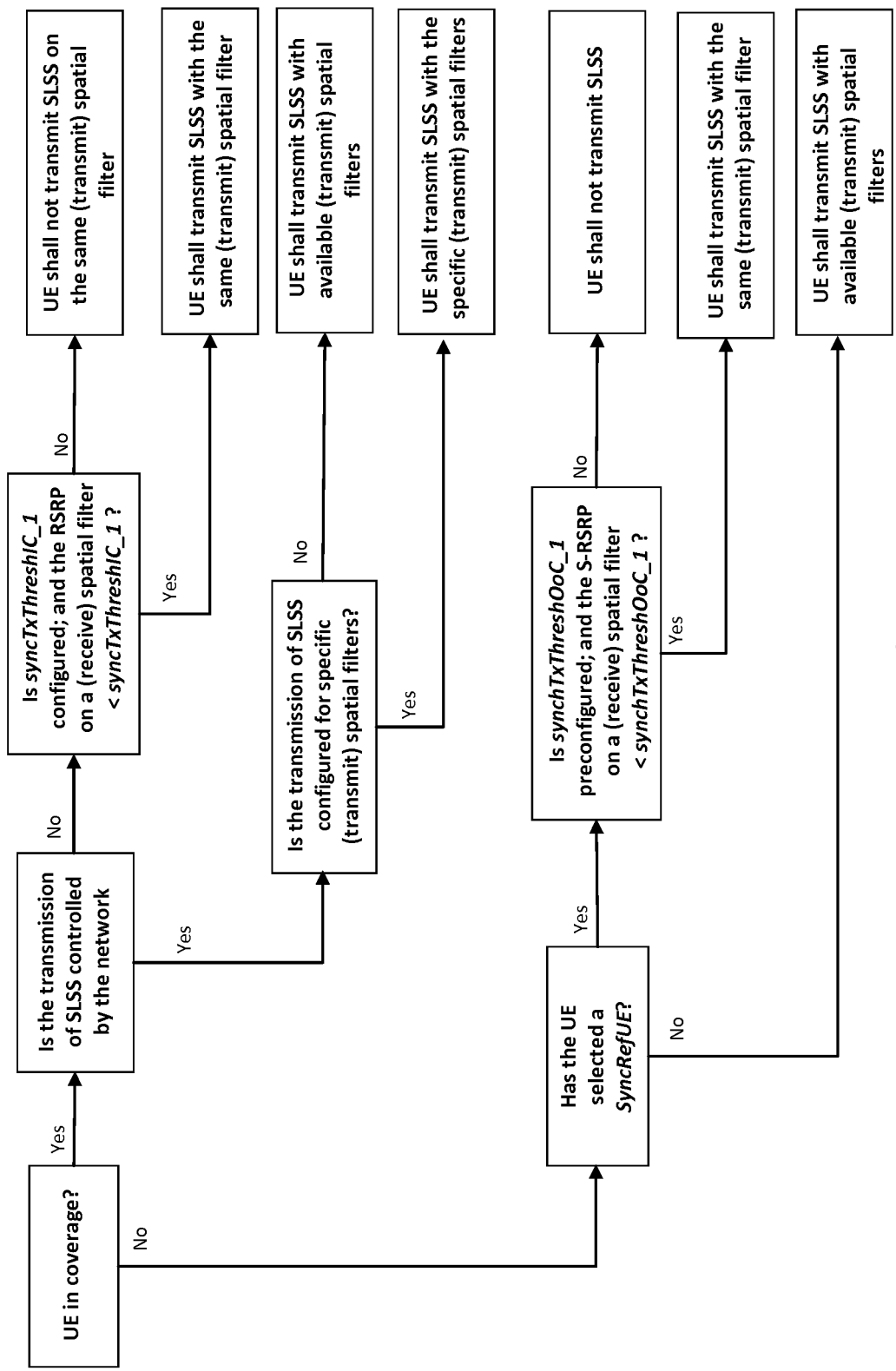
FIG. 7 shows a flowchart of an operating manner of a device according to an embodiment of the present invention.

FIG. 7 depicts a flow chart of an embodiment for the proposed network-based method and for the proposed UE-based method 1. If the UE is in coverage, it first needs to check if the transmission of SLSS by the UE is controlled by the network. For example, in LTE Rel. 14, this is done by configuring the parameter networkControlledSyncTx configured and setting it to on. If the transmission of SLSS by the UE is controlled by the network (network-based case), the UE shall transmits SLSS with available (transmit) spatial filters, if the network has not configured the transmission of SLSS for specific (transmit) spatial filters. It is to be noted that available (transmit) spatial filters may refer to a single beam if the UE has only one beam. However, if the network has configured the transmission of SLSS for specific (transmit) spatial filters, the UE shall transmit SLSS with the specific (transmit) spatial filters. The specific (transmit) spatial filters may be indicated implicitly or explicitly by the network, based on prior measurement reports. On the other hand, if the UE is in coverage and the transmission of SLSS by the UE is not controlled by the network, the UE checks if the in coverage threshold for method 1 is configured. In this example, it is assumed that the threshold for the in coverage case is given by the parameter syncTxThreshIC_1, without loss of generality. This threshold may be provided by the network via the system information. If the threshold is configured, this is the in coverage UE-based case, where if the RSRP measurement of the synchronization reference on a (receive) spatial filter is below the threshold, the UE shall transmit SLSS with the same (transmit) spatial filter. Moreover, if the UE is out of coverage, this is the out of coverage UE-based case, where if the UE has not selected another UE as its synchronization reference, i.e. a SyncRefUE, then the UE shall transmit SLSS with available (transmit) spatial filters. Note that the UE may select GNSS as its synchronization source, in which case it has not selected another UE as its synchronization source and shall transmit SLSS with available (transmit) spatial filters. If the UE has selected a SyncRefUE as its synchronization source, then it checks if the out of coverage threshold for method 1 is preconfigured. In this example, it is assumed that the threshold for the out of coverage case is given by the parameter synchTxThreshOoC_1, without loss of generality. This threshold may be included in the preconfigured sidelink parameters, e.g. in SL-Preconfiguration in LTE Rel. 14. If the threshold is preconfigured and if S-RSRP measurement of the synchronization reference on a (receive) spatial filter is below the threshold, the UE shall transmit SLSS with the same (transmit) spatial filter.

Figure 8:
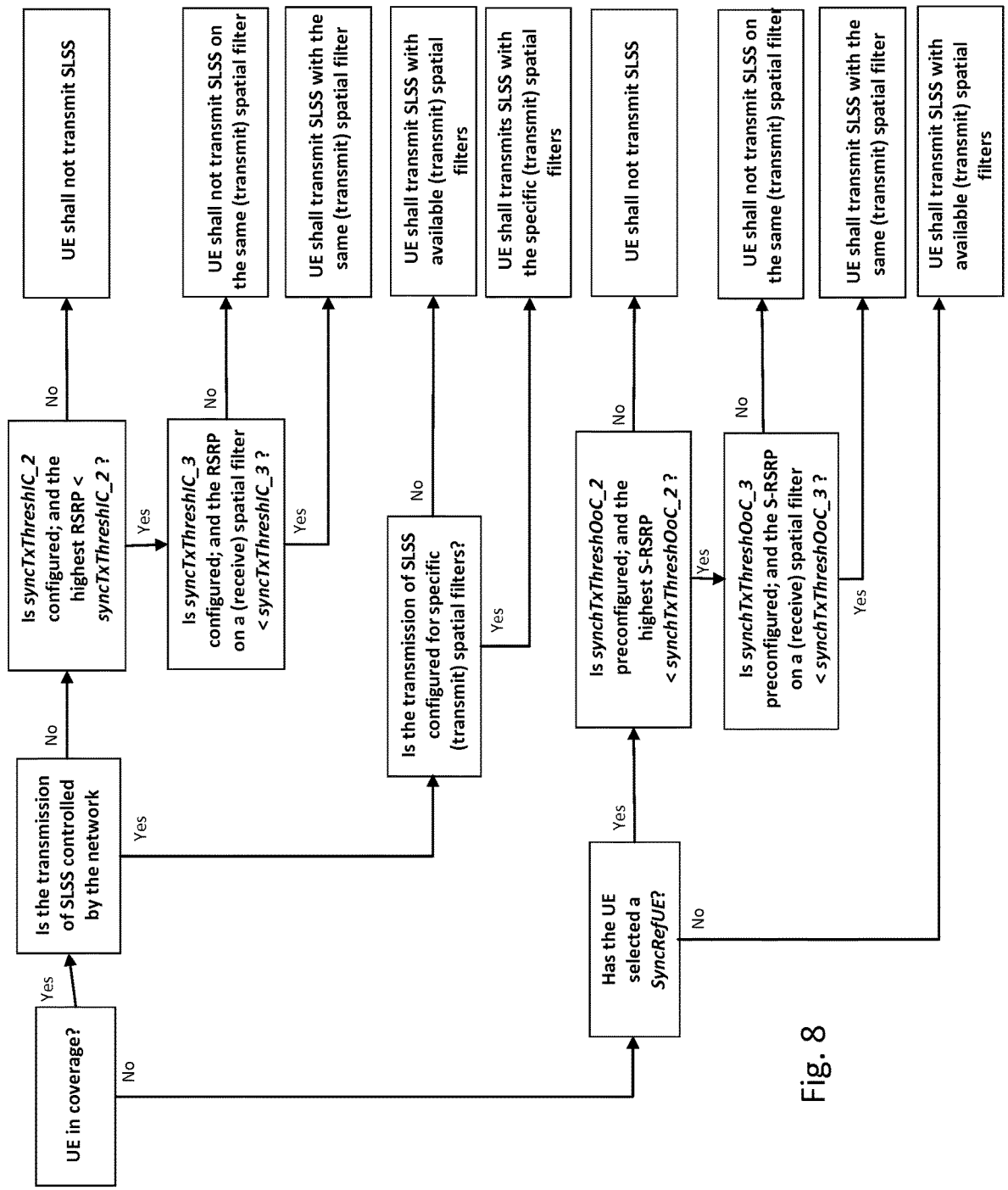
FIG. 8 shows another flow-chart of an operating manner of a device according to an embodiment of the present invention.

FIG. 8 depicts the flow chart of an embodiment of the proposed network-based method and for the proposed UE-based method 2. In contrast to method 1, method 2 considers two thresholds: for the given example syncTxThreshIC_2 and syncTxThreshIC_3, without loss of generality, when in coverage, and synchTxThreshOoC_2 and synchTxThreshOoC_3, without loss of generality, when out of coverage. The description of FIG. 8 follows the one provided for the flow chart in FIG. 7 with syncTxThreshIC_3 and syncTxThreshOoC_3 instead of syncTxThreshIC_1 and syncTxThreshOoC_1, respectively, with the difference that for the UE-based case, the UE considers to transmit SLSS only if the highest RSRP measurement of the synchronization reference is below a first threshold, i.e. syncTxThreshIC_2 or syncTxThreshOoC_2 when in coverage or out of coverage, respectively. If this first condition is not fulfilled, the UE shall not transmit SLSS. If this first condition is fulfilled, then the UE shall transmit SLSS on the spatial filters on which the RSRP measurement of the synchronization reference is below the second threshold, i.e. syncTxThreshIC_3 or syncTxThreshOoC_3 when in coverage or out of coverage, respectively.

The flow charts of the previous embodiments can be modified to consider when no beam correspondence holds at the UE based on method 3.

The previous embodiments can be extended to consider multiple candidate synchronization references based on method 1-A, method 2-A, method 2-B, and method 3-A.

The previous embodiments can be extended to configure the UE to consider only certain synchronization references. A UE may be configured to consider only the RSRP or S-RSRP of synchronization references which are in coverage, when determining to transmit SLSS, i.e. S-RSRP measurements from out of coverage SyncRefUEs shall not be considered. A UE may be configured to consider the RSRP or S-RSRP measurement of a candidate synchronization reference when determining to transmit SLSS, instead of considering the RSRP or S-RSRP measurement of the UE's synchronization reference.

The previous embodiments can be extended to consider other additional features, in particular, to configure the UE to make measurements on specified resources when determining to transmit SLSS and to configure the UE to use only a specific set of spatial filters for the transmission of SLSS.

Figure 9:
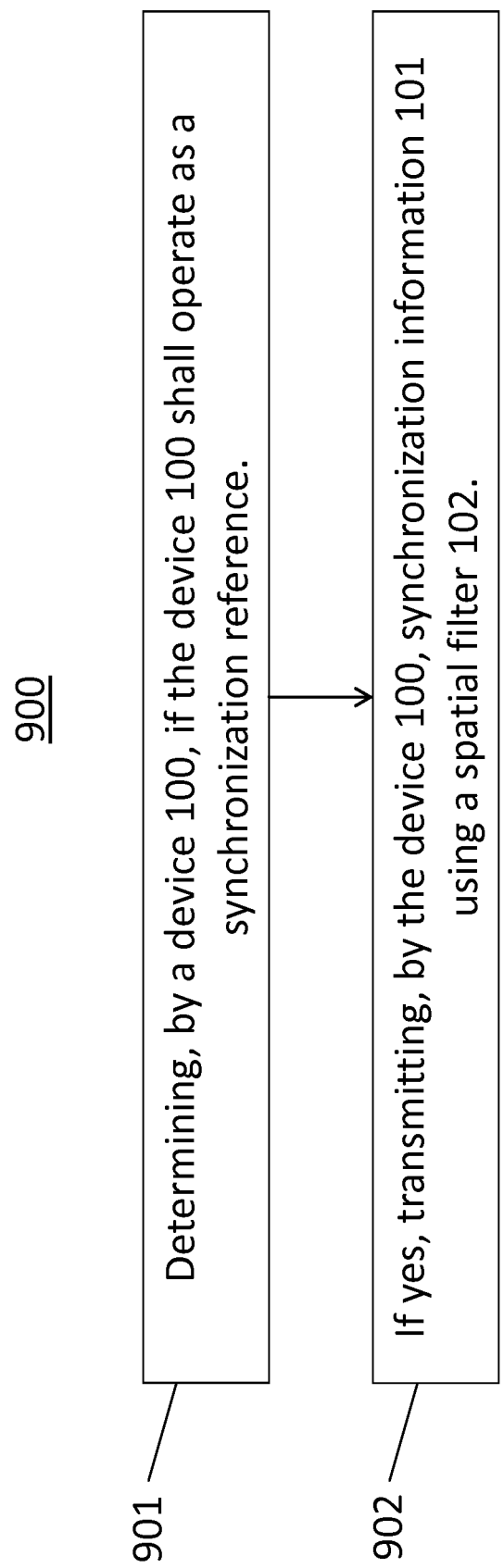
FIG. 9 shows a schematic view of a method according to an embodiment of the present invention.

FIG. 9 shows a schematic view of a method 900 according to an embodiment of the present invention. The method 900 is for transmitting synchronization information 101, and comprises a first step of determining 901, by a device 100, if the device 100 shall operate as a synchronization reference. The method comprises a second step of, if yes, transmitting 902, by the device 100, a synchronization information 101 using a spatial filter 102.

Figure 10:
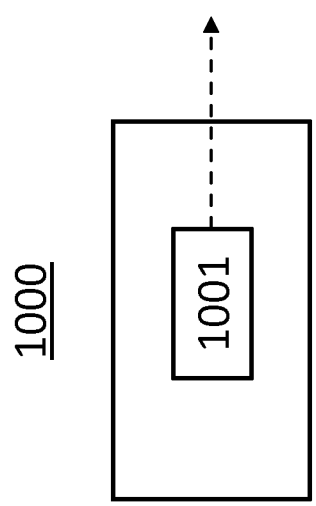
FIG. 10 shows a schematic view of a network-side device according to an embodiment of the present invention.
Figure 11:
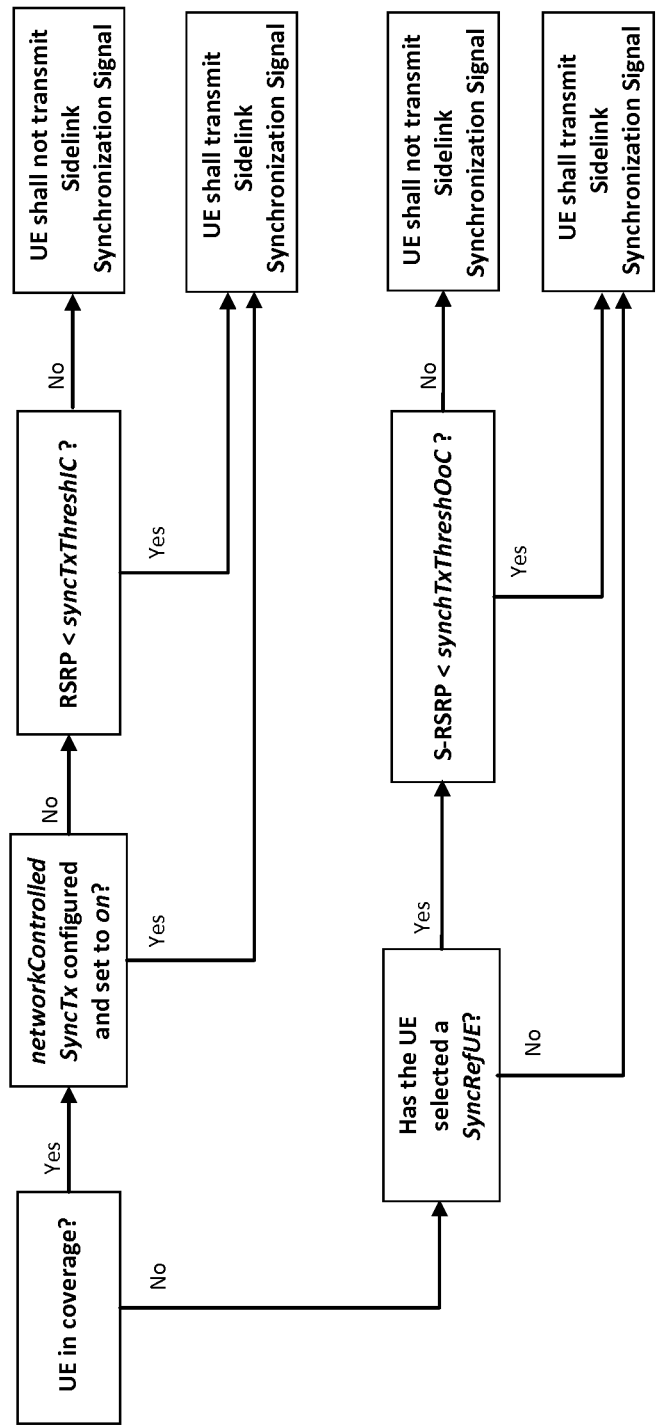
FIG. 11 shows a flowchart of an operating manner of a device according to the prior art.
Figure 12:
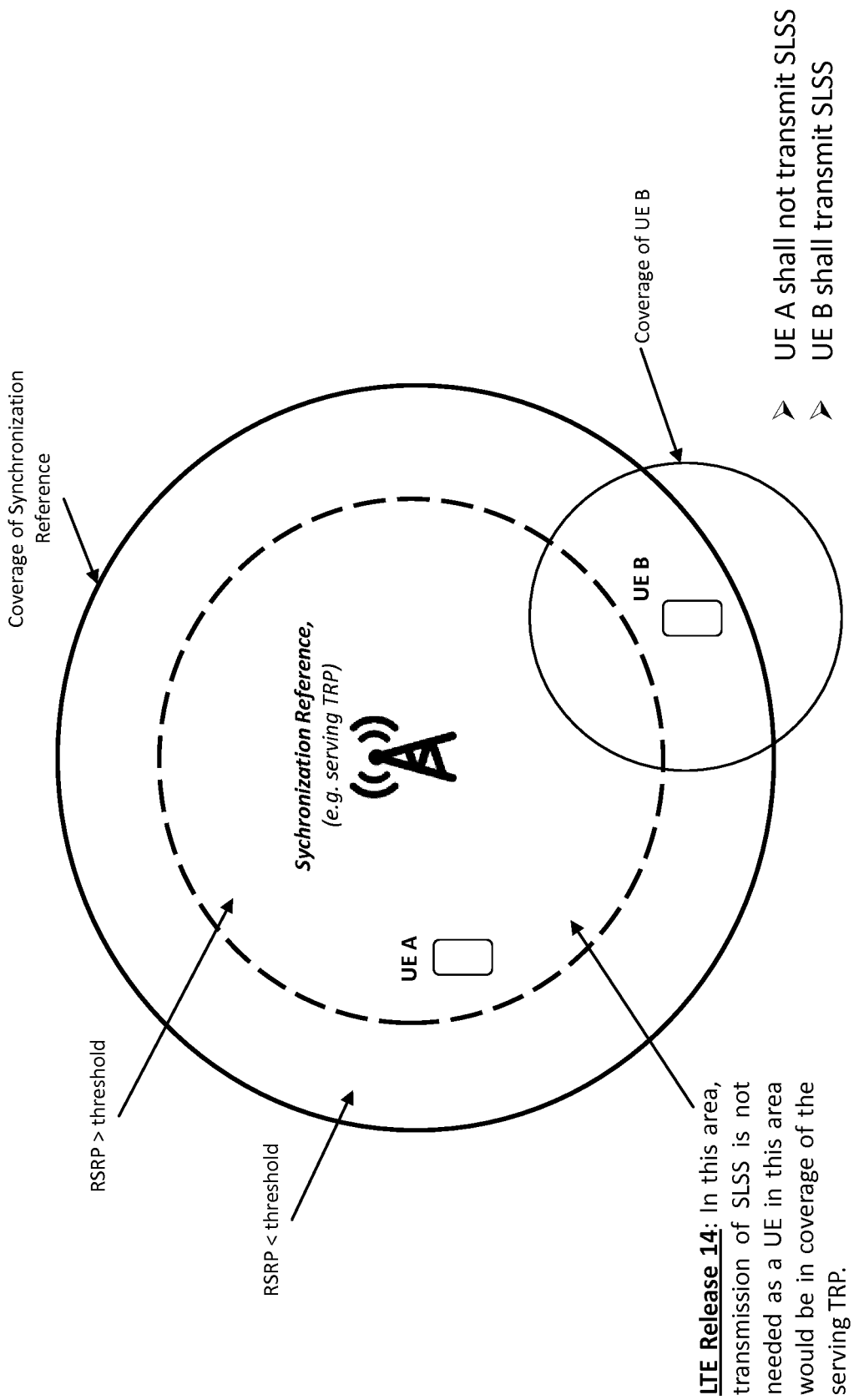
FIG. 12 shows an operating manner of a device according to the prior art.

FIG. 10 shows a schematic view of a network-side device 1000 according to an embodiment of the present invention. The network-side device 1000 is for determining and transmitting configuration information. It is thus configured to determine configuration information 1001 for transmitting synchronization information 101 by a device 100, wherein the configuration information 1001 supports the device 100 in determining, if the device 100 is a synchronization reference, and in configuring a spatial filter 102. The network-side device 1000 is further configured to transmit the configuration information 1001 to the device 100.

The configuration information 1001, in particular, can include a reference signal.

The network side device 1001 can further be configured to configure a first threshold value, and/or a second threshold value, and/or a third threshold value in the device 100, for determining by the device 100, if the device 100 is a synchronization reference.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description, the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A device for transmitting synchronization information, comprising:
   at least one processor; and
   a memory storing instructions that are executable by the at least one processor, the instructions including instructions to:
   determine whether the device should operate as a synchronization reference based on information obtained by the device;
   configure a spatial filter according to the information obtained by the device; and
   transmit, in response to determining that the device should operate as the synchronization reference, synchronization information using the spatial filter.

2. The device according to claim 1, wherein the information obtained by the device is configuration information received from a network-side device, and
   wherein the instructions further include instructions to configure the spatial filter according to the configuration information received from the network-side device.

3. The device according to claim 1, wherein the instructions further include instructions to operate as a synchronization reference in response to the device being out of coverage of a synchronization reference signal provided by a network-side device.

4. The device according to claim 1, wherein the device is instructions further include instructions to operate as a synchronization reference in response to a first value being lower than a first threshold value, wherein the first value is obtained based on a reference signal, and wherein the first threshold value is configured by a network-side device.

5. The device according to claim 4, wherein the instructions further include instructions to configure at least one of the spatial filter or transmission of the synchronization information based on at least one of the first value or the first threshold value.

6. The device according to claim 4, wherein the instructions further include instructions to configure the spatial filter based on a correlation between a first spatial receive filter and the spatial filter.

7. The device according to claim 4, wherein the instructions further include instructions to operate as a synchronization reference in response to a second value being lower than a second threshold value, and further in response to the first value being lower than the first threshold value, wherein the second value is obtained based on the reference signal, and wherein the second threshold value is configured by a network-side device.

8. The device according to claim 7, wherein a direction of the reference signal associated with obtaining the first value is different from a direction of the reference signal associated with obtaining the second value.

9. The device according to claim 7, wherein the instructions further include instructions to configure at least one of the spatial filter or transmission of the synchronization information based on at least one of the second value or the second threshold value.

10. The device according to claim 1, wherein the instructions further include instructions to operate as a synchronization reference and transmit the synchronization information in response to a third value being lower than a third threshold value, wherein the third value is obtained based on a reference signal, wherein the third threshold value is configured by a network-side device.

11. The device according to claim 1, wherein the instructions further include instructions to configure at least one of the spatial filter or transmission of the synchronization information based on a further synchronization reference.

12. A method for transmitting synchronization information, comprising:
    determining, by a device, whether the device should operate as a synchronization reference, wherein determining whether the device should operate as the synchronization reference comprises determining that the device should operate as the synchronization reference in response to a first value being lower than a first threshold value, wherein the first value is obtained according to a reference signal, and wherein the first threshold value is configured by a network-side device; and
    transmitting, by the device, in response to determining that the device should operate as the synchronization reference, a synchronization information using a spatial filter.

13. The method according to claim 12, further comprising configuring, by the device, at least one of the spatial filter or transmission of the synchronization information based on at least one of the first value or the first threshold value.

14. The method according to claim 12, further comprising configuring the spatial filter based on a correlation between a first spatial receive filter and the spatial filter.

15. The method according to claim 12, wherein determining whether the device should operate as the synchronization reference comprises determining that the device should operate as the synchronization reference in response to a second value being lower than a second threshold value, and in response to the first value being lower than the first threshold value, wherein the second value is obtained based on the reference signal, and wherein the second threshold value is configured by a network-side device.

16. The method according to claim 15, wherein a direction of the reference signal associated with obtaining the first value is different from a direction of the reference signal associated with obtaining the second value.

17. A network-side device, comprising:
    at least one processor; and
    a memory storing instructions that are executable by the at least one processor, the instructions including instructions to:
    determine configuration information for transmitting synchronization information by a device, wherein the configuration information is associated with support of the device in determining whether the device is a synchronization reference and is further associated with configuring a spatial filter by the device;
    transmit the configuration information to the device; and
    configure, at the device, at least one of a first threshold value, a second threshold value, or a third threshold value for determining, by the device, whether the device is a synchronization reference.

18. The network-side device according to claim 17, wherein the instructions include instructions to configure, at the device, the first threshold value, the second threshold value, and the third threshold value for determining, by the device, whether the device is a synchronization reference.

19. The network-side device according to claim 17, wherein the instructions include instructions to configure, at the device, the first threshold value and the second threshold value for determining, by the device, whether the device is a synchronization reference.

* * * * *

UNITED STATES PATENT AND TRADEMARK OFFICE
CERTIFICATE OF CORRECTION

PATENT NO. : 12,041,565 B2
APPLICATION NO. : 17/436955
DATED : July 16, 2024
INVENTOR(S) : Castaneda et al.

It is certified that error appears in the above-identified patent and that said Letters Patent is hereby corrected as shown below:

In the Claims

In Column 17, in Claim 4, Line 29, after "wherein the" delete "device is".

Signed and Sealed this
Thirteenth Day of August, 2024

Katherine Kelly Vidal
*Director of the United States Patent and Trademark Office*